United States Patent [19]

Doi et al.

[11] 4,215,335

[45] Jul. 29, 1980

[54] DIGITAL SIGNAL TRANSMISSION METHOD

[75] Inventors: Toshitada Doi, Yokohama; Takashi Ito, Tokyo, both of Japan

[73] Assignee: Sony Corporation, Tokyo, Japan

[21] Appl. No.: 865,200

[22] Filed: Dec. 28, 1977

[51] Int. Cl.$^2$ .................... G06F 11/00; G08C 25/00
[52] U.S. Cl. .................................................. 371/69
[58] Field of Search ............... 340/146.1 BE; 325/39, 325/41, 44; 358/142, 144; 360/32, 33, 36; 179/15.55 T, 15 AV

[56] References Cited

U.S. PATENT DOCUMENTS

| | | | |
|---|---|---|---|
| 3,195,048 | 7/1965 | Adams et al. | 340/146.1 BE |
| 3,526,837 | 9/1970 | Zegers et al. | 340/146.1 BE |
| 3,665,395 | 5/1972 | Bochmann | 340/146.1 BE |
| 3,781,795 | 12/1973 | Zegers | 340/146.1 BE |
| 3,988,677 | 10/1976 | Fletcher et al. | 325/41 |
| 4,001,692 | 1/1977 | Fenwick et al. | 325/39 |
| 4,025,720 | 5/1977 | Pachynski, Jr. | 179/15.55 T |

OTHER PUBLICATIONS

Iwamura et al., Pulse-Code-Modulation Recording System, Journal of the Audio Engineering Society, vol. 21, No. 7, Sep. 1973, pp. 535-541.

Sato, PCM Recorder-A New Type of Audio Magnetic Tape Recorder, Journal of the Audio Engineering Society, vol. 21, No. 7, Sep. 1973, pp. 542-548.

*Primary Examiner*—Charles E. Atkinson
*Attorney, Agent, or Firm*—Lewis H. Eslinger; Alvin Sinderbrand

[57] ABSTRACT

Groups of primary multi-bit digital signals arranged in digital words are spaced apart in sequence and are interleaved with related groups of secondary multi-bit digital signals, each of which is derived from, and encodes substantially the same information as, one of the primary signals. To minimize errors in processing signals, either the primary signals are delayed relative to the secondary signals, or vice versa, before they are interleaved. Cyclic redundancy check code signals are derived for each group of primary signals and each group of secondary signals and are interleaved in sequence with the primary and secondary signals. At a further stage in processing the signals, the checked code signals are analized and the related pairs of primary and secondary signals, which have been brought back into coincidence, are checked to determine whether one or both of the primary and the secondary signals of each related pair has been processed without error. If only one of the signals has been processed without error, that signal is selected for further processing. If both signals have been processed without error a predetermined one of them is selected for further processing. If neither one of them has been processed without error, the immediately preceding signal that was selected may be selected a second time. In order to incorporate all of the signals in the most convenient format, the secondary signals may comprise only the higher bit orders of the primary signals, eliminating some of the lower bit orders as containing unnecessarily detailed information. The number of bits thus omitted preferably causes a group of secondary signals plus the cyclic redundancy check code signals for that group and for the related primary group to equal the total number of bits of that primary group.

25 Claims, 27 Drawing Figures

FIG. 7A GATE 1

FIG. 7B GATE 2

FIG. 7C GATE 1

FIG. 7D GATE 2

DIGITAL SIGNAL TRANSMISSION METHOD

BACKGROUND OF THE INVENTION

1. Field of the Invention

This invention relates to the processing of digital signals in such a way that there is a high probability of detecting and correcting errors in certain stages of the processing. In particular, the invention relates to deriving primary pulse code modulation (PCM) multi-bit digital signals from an analog signal, deriving secondary PCM signals from the same values of the analog signal as were included into the primary PCM signals, delaying either the primary or secondary signals, and combining groups of the delayed signals in interleaved sequence with groups of the relatively undelayed signals.

2. The Prior Art

It has been proposed in companion patent applications, Ser. No. 776,746 and 771,350, filed Feb. 8, 1977 and Feb. 23, 1977, respectively, both assigned to the assignee of the present application, to process analog audio signals on a video tape recorder (VTR). These companion applications, along with a third companion application, Ser. No. 860,883 filed Dec. 15, 1977, describe techniques for encoding the audio signals by means of PCM techniques and arranging the resultant pulse signals to correspond to a video format so as to be handled easily by a VTR.

The analog signals are sampled at a frequency at least substantially twice as high as the highest information frequency embodied in such signals. A convenient sampling rate is three times the horizontal line frequency rate of the video signal, because this makes the resultant sampled signal commensurate with video horizontal synchronizing signals incorporated into the psuedo-video format.

VTRs are capable of handling audio signals with excellent fidelity, but there is still an occasional problem of loss of signal due to a drop out or to a noise burst. Since the quality of reproduction possible with equipment of the type described hereinafter is sufficiently high to be consistent with commercial standards, it is important to avoid even occasional errors in the processed signals.

OBJECTS AND SUMMARY OF THE INVENTION

It is one of the objects of this invention to minimize the error in processing digital signals by providing time displacement of groups of such signals with respect to groups of signals containing substantially the same information.

It is a further object of this invention to incorporate code signals along with groups of primary and secondary multibit digital signals to make it possible to determine whether one, both, or neither of the processed signals is free of error and to arrange for further processing of a selected one of the signals chosen because of its minimum error.

Further object will be apparent from the following description and the related drawings.

In accordance with this invention a multi-bit digital signal, referred to as a primary signal and a secondary multi-bit digital signal on which the same information is encoded in the same PCM arrangement, except that the lowest bit orders of the primary signal may be omitted from the secondary signal, are arranged in corresponding, or related, groups, each of which may comprise a digital word signal. Either the primary signal is delayed relative to the secondary signal or the secondary signal is delayed relative to the primary signal, and groups are then interleaved to form a sequential multi-bit signal. After this sequential has been processed, related groups may be brought back into coincidence, and one of the signals selected for further processing. This selection is made on the basis of which signal is error free at that point. If both of the signals are error free, a predetermined one of them is selected for further processing. If neither signal is error free, a preceding, temporarily stored signal may be processed a second time instead of processing either of the erroneous signals.

In order to determine which signal is error free, cyclic redundancy check code signals are obtained for both the primary and secondary PCM signals prior to processing, and these cyclic redundancy check code signals (CRC) are interleaved with the primary and secondary signals to make up a complete sequential signal. In determining whether there is an error in either of the processed signals, the primary and secondary signals may be measured for coincidence, and if they do coincide, the present invention provides that one of them, usually the primary signal, be chosen for further processing. Simultaneously, the CRC signals for the respective primary and secondary signals may be used to determine whether either the primary or secondary signal is error free. If only one of these signals is error free, which means that the two signals would not be found to be in coincidence, the error free signal is automatically selected for further processing. Each signal selected for further processing is retained in what may amount to a temporary memory circuit to be used yet again if neither of the next succeeding pair of primary and secondary signals is error free. Continued utilization of the same signal a second time is consistent with the fact that it is likely to be less distracting if the output signal does not vary at all for an additional increment of time than if it varies sharply.

In order to provide time for inserting the secondary signal groups and the CRC signals in sequence with the primary signal groups, both the primary and secondary signals are subjected to time compression. This may be effected by applying these signals to memory circuits at one clocking rate and reading them out of the memory circuits at a different clocking rate. For ease of handling the signals in subsequent circuits, such as the coincidence circuit, it is preferable that the time compression of the primary signals be exactly equal to the time compression of the secondary signals. Since both of these signals contain substantially the same information, except, possibly, for information encoded in the least significant bits of the primary signal, the time compression should be approximately 2:1. In fact, by omitting enough of the least significant bits of the primary signal to correspond to the bits that are required to transmit the CRC signals, the sum of the truncated secondary signal groups plus the two sets of CRC signals may be made exactly equal to the number of bits of the primary signal groups so that time compression of exactly 2:1 will result in a uniformly dense sequential pulse signal.

A further time compression is required to allow space between certain of the pulses to insert horizontal and vertical synchronizing and equalizing signals. In addition, since it is desireable to provide an integral number of complete, or composite, groups in each horizontal video interval, it is also desirable to include word synchronizing pulses between each pair of composite groups. The term "composite" is used to indicate that such a group includes a primary signal digital word, the CRC signal for that word, a secondary digital word spaced in time from the primary digital word, and the CRC signal for the secondary signal.

One of the coding concepts to be used in the following disclosure is known as the cyclic redundancy check code (CRC). The mathematical aspects of the CRC will be described first in terms applicable to the embodiment that follows.

CYCLIC REDUNDANCY CHECK CODE

The CRC code is generally expressed by a polynomial F(x) with indeterminant x and coefficients from an n bit code ($a_{n-1}$, $a_{n-2}$, --- $a_1$, $a_0$) as follows, $$F(x) = a_{n-1}x^{n-1} + a_{n-2}x^{n-2} + \cdots + a_0$$

For example, if the 5 bit code (10011) is expressed by the polynomial F(x), then $$F(x) = x^4 + x + 1$$

This polynomial is called the polynomial over Galois field of 2.

The encoding and decoding of the CRC code is essentially characterized by a division algorithm such that the code polynomial F(x) is divided by the generator polynomial G(x).

Now assuming that the code polynomial of degree (k−1) for a k bit code is expressed as M(x) and the generator polynomial of degree (n-k) as G(x), the division algorithm is as follows, $$M(x)x^{n-k} = G(x) Q(x) + R(x)$$

in which Q(x) is the quotient polynomial and R(x) is the remainder polynomial having a greatest degree of (n−k−1). It should be noted that the encoded code polynomial V(x) comprises the code polynomial M(x) $x^{n-k}$ and the remainder polynomial R(k) added to the former polynomial. Therefore, the encoded polynomial V(x) has degree (n−1) and is given as follows:

$$V(x) = M(x)x^{n-1} + R(x)$$
$$= G(x)Q(x)$$

This means that the encoded polynomial V(x) is divisible by the generator polynomial G(x).

Next, if a noise signal, which is expressed by a polynomial E(x), i introduced into the code polynomial V(x) during transfer, the code polynomial V'(x) at the decoding side is expressed as follows:

$$V'(x) = V(x) + E(x)$$

If no error is introduced therein, E(x)=0. Then, V'(x)=V(x) and hence the polynomial V'(x) is divisible by the polynomial G(x).

However, if the polynomial V'(x) is not divisible by the generator polynomial G(x) in the decoder, causing a remainder polynomial R'(x) to be generated, the polynomial V'(x) is regarded as having an error bit. Then, the polynomial V'(x) is given as follows;

$$V'(x) = G(x) Q'(x) + R'(x)$$

The polynomial V(x) should be divisible by the generator polynomial G(x), so that the remainder polynomial R'(x) must be the remainder in the dividing algorithm of dividing the polynomial E(x) by the generator G(x). Accordingly, it is apparent that the remainder polynomial R'(x) is a factor showing whether or not the code polynomial V'(x) contains the error bits. Such a remainder R'(x) is called a syndrome.

One example will be shown in the condition of n=7, k=4 and the generator polynomial $G(x)=x^3+x+1$,

---

(1) M(x) = $x^3$ + 1 = (1001)
    M(x)$x^3$ = $x^6$ + $x^3$
    M(x)$x^3$ = G(x)Q(x) + R(x)
    R(x) = $x^2$ + x
(2) V(x) = M(x)$x^3$ + R(x) = $x^6$ + $x^3$ + $x^2$ + x = (1001110)
(3) E(x) = $x^5$ = (0100000)
(4) V'(x) = V(x) + E(x) = $x^6$ + $x^5$ + $x^3$ + $x^2$ + x = (1101110)
    V'(x) = G(x)Q'(x) + R'(x)
(5) R'(x) = $x^2$ + x + 1 = (111)

---

The basic circuit of the CRC code encoder and decoder comprises a dividing circuit with the divisor G(x) which generates the remainder, not the quotient. The dividing circuit is essentially formed by a shift register, each stage of which is preceded by a modulo 2 after that adds, on a modulo 2 basis (which means counting to the base 2 without carry), the output of the preceding stage and output of the shift register according to whether the appropriate element of the polynomial is $g_i=1$ or $g_i=0$ in the divisor $G(x)=g_nx^n+g_{b-1}x^{n-1}+g_{n-2}x^{n-2}+\cdots+g_2x^2+g_1x+g_0$.

Now, the generator polynomial G(x) in the above example is given as follows:

$$G(x) = x^3 + x + 1$$

Accordingly, the dividing circuit of the polynomial G(x) includes a three-stage shift register with feedback loops from the output to modulo 2 adders at the input and between the first and second stages. The clocking conditions in each shift register stage and the calculation example are shown;

$$E(x) = 0 \quad (i)$$
$$V(x) = x^6 + x^3 + x^2 + x$$

$$x^3 + x + 1 \overline{\smash{\big)}\, \begin{array}{l} x^3 + x \\ x^6 \phantom{+ x^4} + x^3 + x^2 + x \\ \underline{x^6 + x^4 + x^3} \\ \phantom{x^6 +} x^4 \phantom{+ x^3} + x^2 + x \\ \phantom{x^6 +} \underline{x^4 \phantom{+ x^3} + x^2 + x} \\ \phantom{x^6 + x^4 + x^3 + x^2 + x} 0 \end{array}}$$

TABLE I

| clock | input | Conditions in shift registers | | |
|---|---|---|---|---|
| | | $D_0$ | $D_1$ | $D_2$ |
| (initial condition) | | 0 | 0 | 0 |
| $t_1$ | 1 | 1 | 0 | 0 |
| $t_2$ | 0 | 0 | 1 | 0 |
| $t_3$ | 0 | 0 | 0 | 1 |
| $t_4$ | 1 | 0 | 1 | 0 |
| $t_5$ | 1 | 1 | 0 | 1 |
| $t_6$ | 1 | 0 | 0 | 0 |
| $t_7$ | 0 | 0 | 0 | The remainder 0 |

$$E(x) = x^5 \quad (ii)$$
$$V(x) = x^6 + x^5 + x^3 + x^2 + x$$

$$x^3 + x + 1 \overline{\smash{\big)}\, \begin{array}{l} x^3 + x^2 + x + 1 \\ x^6 + x^5 \phantom{+ x^4} + x^3 + x^2 + x \\ \underline{x^6 \phantom{+ x^5} + x^4 + x^3} \\ x^5 + x^4 \phantom{+ x^3} + x^2 + x \\ \underline{x^5 \phantom{+ x^4} + x^3 + x^2} \\ x^4 + x^3 \phantom{+ x^2} + x \\ \underline{x^4 \phantom{+ x^3} + x^2 + x} \\ x^3 + x^2 \\ \underline{x^3 \phantom{+ x^2} + x + 1} \\ x^2 + x + 1 \end{array}}$$

the remainder $\quad x^2 + x + 1$

TABLE 2

| Clock | input | Conditions in shift registers | | |
|---|---|---|---|---|
| | | $D_0$ | $D_1$ | $D_2$ |
| (initial condition) | | 0 | 0 | 0 |
| $t_1$ | 1 | 1 | 0 | 0 |
| $t_2$ | 1 | 1 | 1 | 0 |
| $t_3$ | 0 | 0 | 1 | 1 |
| $t_4$ | 1 | 0 | 1 | 1 |
| $t_5$ | 1 | 0 | 1 | 1 |
| $t_6$ | 1 | 0 | 1 | 1 |
| $t_7$ | 0 | 1 | 1 | The Remainder 1 |

Accordingly, the contents of the shift register show whether or not the transferred code contains error bits.

Figure 1:
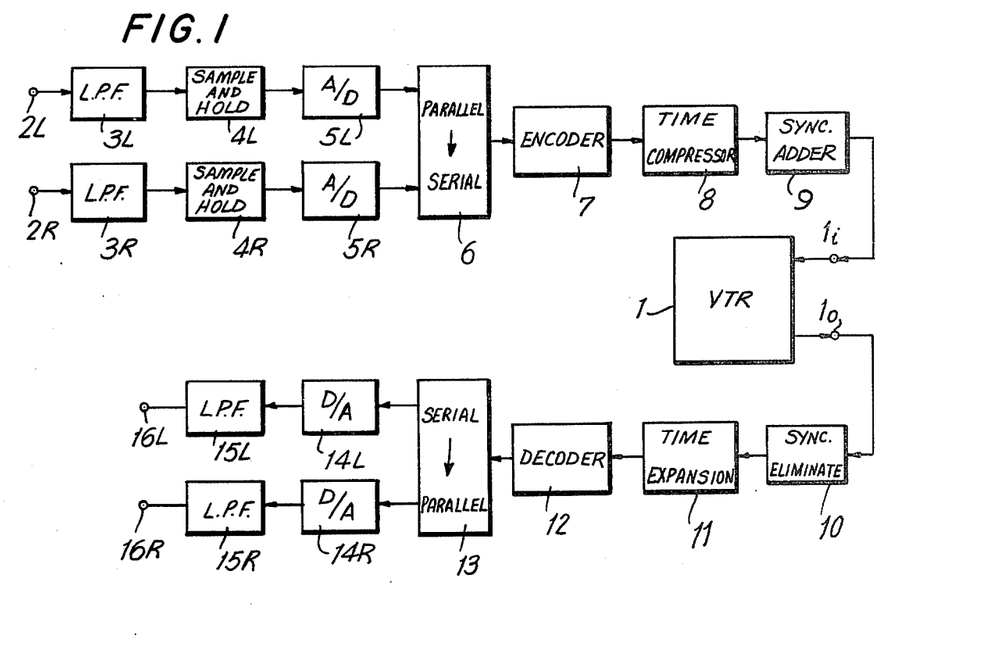
FIG. 1 is a block diagram of a signal processing system according to the present invention.

The circuit in FIG. 1 includes a VTR 1 which may be, for example, of the type referred to in the companion applications, supra. The VTR has an input terminal $1_i$ and an output terminal $1_o$.

The system is arranged for use with stereophonic audio signals, although it can be used with other types of signals. As set up for stereophonic audio signals, it includes two input terminals 2L and 2R, to which the left and right audio signal channels may be applied, respectively. The input terminal 2L is connected to a low pass filter 3L which is connected, in turn, to a sample-and-hold circuit 4L. The output signals of the sample-and-hold circuit is connected to an analog-to-digital (A-D) circuit 5L, the output of which is connected to a parallel-to-serial converter 6.

The input terminal 2R is connected to the parallel-to-serial converter 6 through an identical circuit including a low pass filter 3R, a sample-and-hold circuit 4R and a A-D circuit 5R.

The output of the converter 6 is connected to an encoder 7 which will be described in greater detail hereinafter in conjunction with FIGS. 2–7. Following the encoder 7 is a time compressor 8 that provides additional time compression of the output signal of the encoder to allow for insertion of synchronizing signals in a synchronizing signal adder circuit 9 that follows the time compressor 8. The output of the synchronizing signal adder circuit 9 is connected to the input terminal $1_i$ of the VTR 1.

The circuit to this point includes the elements used in recording a signal in the VTR 1. For playing back signals previously recorded, the output terminal $1_o$ of the VTR 1 is connected to a synchronizing signal eliminator circuit 10 that extracts the synchronizing signals and utilizes them in the control of the VTR in the normal manner. The output of the synchronizing signal eliminator circuit 10 is connected to a time expansion circuit that returns the spacing between successive pulse signals to an even amount and closes the gaps that were provided for insertion of the synchronizing signals. The output of the time expansion circuit 11 is connected to a decoder 12 that performs the converse of the function of the encoder 7 and will be described hereinafter in greater detail, particularly in connection with the circuits in FIGS. 8–14.

The output of the decoder 12 is connected to a serial-to-parallel circuit 13, which has two output terminals. One of the output terminals is connected to a digital-to-analog (D-A) circuit 14L and the other to a D-A circuit 14R for the left and right audio channels respectively. The output of the D-A circuit 14L is connected through a low pass filter 15L to an output terminal 16L, and the output of the D-A converter 14R is similarly connected through a low pass filter 15R to an output terminal 16R.

The conventional reference oscillator circuits and clocking, synchronizing, and gating signal circuits utilized in conjunction with the sample-and-hold circuits, the A-D and D-A converters, the parallel-to-serial and serial-to-parallel converters, the encoder and decoder, the time compressor and expander circuits, the synchronizing signal adder and eliminator circuits, and the VTR are all standard and need not be described in detail.

Figure 3A:
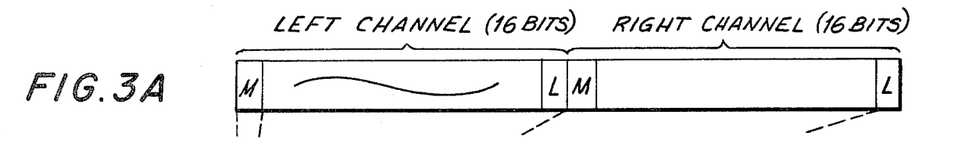
FIGS. 3A–3F are symbolic representations of digital signals illustrating the operation of the circuit in FIG. 1. in accordance with the present invention.

In the operation of the circuit in FIG. 1, audio signals to be processed are sampled at a suitably high rate in the sample-and-hold circuits 4L and 4R. It is convenient and satisfactory for that rate to be three times the repetition rate of a horizontal video synchronizing signal, or about 47.25 KHz. At each sampling, the respective A-D circuits 5L and 5R provide sixteen-bit PCM signals to the converter 6. The latter may be a 32 position shift register clocked at a sufficiently high speed to read out all 32 bits of information applied to the converter from the two A-D converters 5L and 5R. The resulting multi-bit digital signal is represented in FIG. 3A a including a left channel signal with sixteen bits ranging from a most significant bit M to a least significant bit L at a right channel signal that also includes sixteen bits and ranges from a most significant bit M to a least significant bit L. The interval of time required to extract the digital signal represented in FIG. 3A from the converter 6 is equal to the sampling time and therefore, in this embodiment, is H/3, where H is the horizontal line interval of a video signal. The entire multi-bit digital signal represented in FIG. 3A may be considered to be a digital word signal, or digital word group.

Digital word signals like that in FIG. 3A are generated at a constant rate so that three such digital words substantially completely fill up a horizontal line interval. In order to allow time for a comparison signal, the constant flow of signals similar to that in FIG. 3A from the converter 6 to the encoder 7 must be subjected to time compression. This is illustrated in the circuit in FIG. 2.

Figure 2:
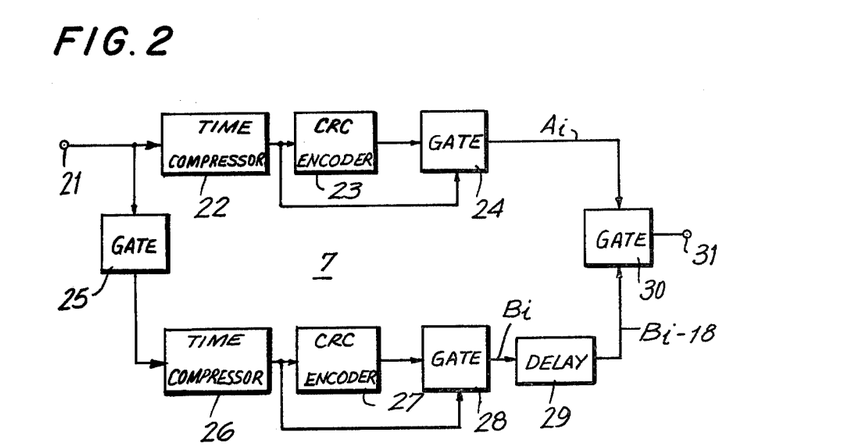
FIG. 2 is a block diagram of an encoder section of the circuit in FIG. 1.

FIG. 2 includes an input terminal 21 connected to a first time compression circuit 22. The output of the time compression circuit 22 is connected to a CRC encoder 23 and to a gate circuit 24 to which the output of the CRC encoder 23 is also connected.

The input terminal 21 is likewise connected to a gate circuit 25, the output of which is connected to a second time compression circuit 26. The output of the latter is connected to a second CRC encoder 27 and to another gate circuit 28. The output of the encoder 27 is also connected to the latter gate circuit. The output of the gate circuit 28 is connected through a delay means 29 to a gate circuit 30 to which the output of the gate circuit 24 is also connected. The gate circuit 30 has an output terminal 31.

Figure 4:
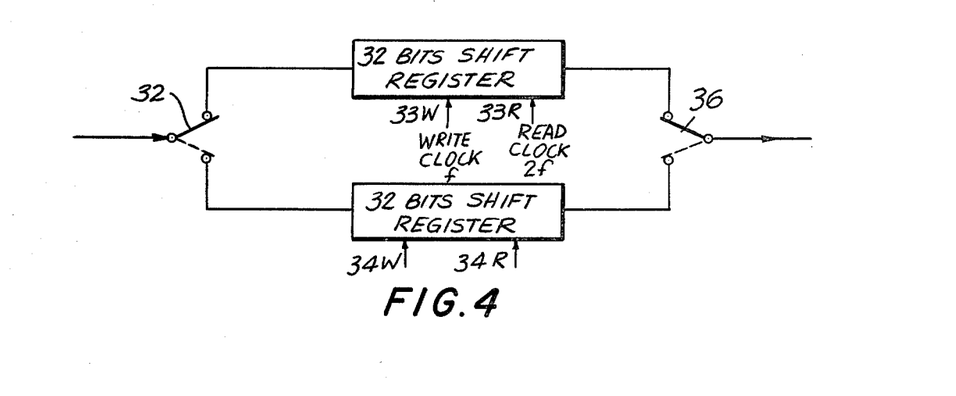
FIG. 4 is a block diagram of a time compressor for use in the circuit in FIG. 2.

The time compression circuit, or time compressor, 22 reduces the length of time required to transmit the digital word signal shown in FIG. 3A. A circuit to accomplish this is shown in FIG. 4 as comprising a double pole input switch 32 connected to inputs of two 32 bit shift registers 33 and 34. The outputs of each of the shift registers 33 and 34 are connected to the terminals of another switch 36. The shift register 33 has a write clock input terminal 33W and and read clock input 33R, and the shift register 34 has similar write and read terminals 34W and 34R, respectively.

Figure 5:
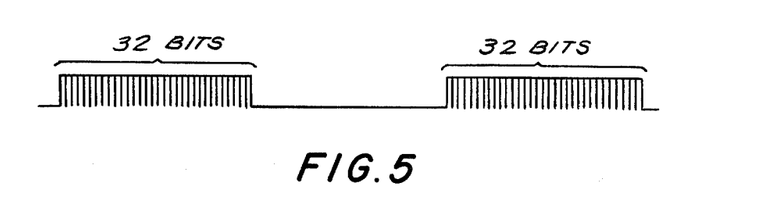
FIG. 5 is a waveform diagram of signals obtained in the operation of the circuit in FIG. 4.

The bits of the signal shown in FIG. 3A are applied continuously to the switch 32 and are connected, one word at a time, to the shift registers 33 and 34 alternately. To accomplish this, the arm of the switch 32 is switched from one of its output terminals to the other at the end of each 32 incoming bits. The information is clocked in to the shift register to which the arm of the switch 32 happens to be connected at any instant by the write clock signal at a frequency equal to the frequency at which the bits are generated in the converter 6 in FIG. 1, but they are read out by the read clock signal at a rate twice the rate at which they are written in. The arm of the switch 36 is connected to whichever one of the two shift registers 33 and 34 is being operated in its "read" mode at any given time. FIG. 5 shows that the 32 bit PCM signal applied to the arm of the switch 32 is, by virtue of being read out at twice the speed that it is written in, compressed by a factor of 2:1. Thus instead of having the 32 bits occupy the full interval of time from one sample to the next, the bits are bunched together as shown in FIG. 5 leaving unused intervals of time, each of which is one half the total interval occupied by the signal shown in FIG. 3A. The second, or comparison, signal, and two sets of CRC signals can be inserted into the resulting unused intervals.

Figure 6:
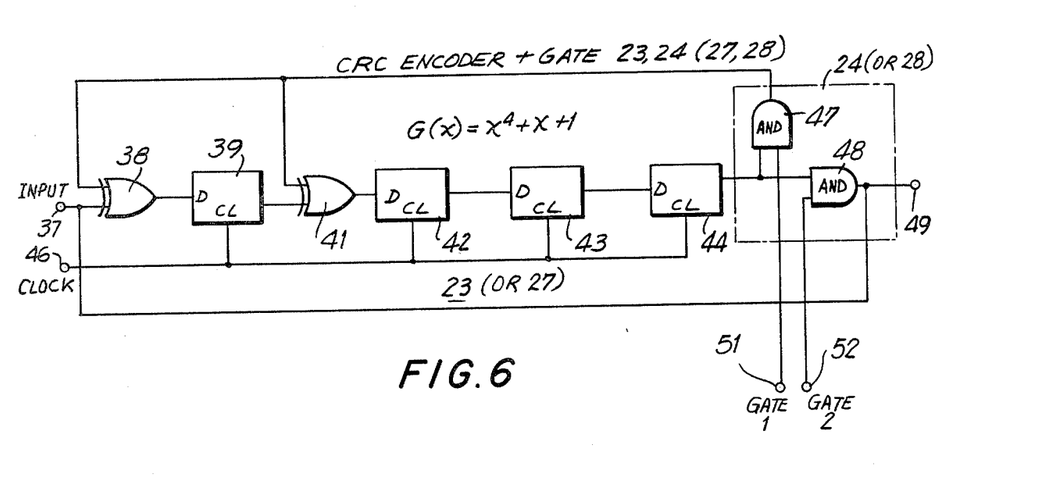
FIG. 6 is a schematic diagram in block form of a CRC encoder and gate suitable for use in the circuit in FIG. 2.

FIG. 6 shows the CRC encoder which may be used either as the encoder 23 or as the encoder 27. The circuit for each is the same and is connected in accordance with the CRC equation $G(x) = x^4 + x + 1$. The encoder has a signal input terminal 37 connected to one input terminal of an exclusive-OR gate 38. The output of the gate 38 is connected to the D input terminal of a D-type flip-flop 39. The output of this flip-flop is connected to one input terminal of another exclusive-OR gate 41, the output terminal of which is connected to the D input terminal of a D-type flip-flop circuit 42. The latter is connected in sequence to two other D-type flip-flop circuits 43 and 44. A clock input terminal 46 is connected to the clock terminals of all four of the flip-flops 39, 42, 43, and 44. The output terminal of the flip-flop 44 is connected through an AND gate 47 back to second input terminals of each of the exclusive-OR gates 38 and 41. The output terminal of the flip-flop 44 is also connected through another AND gate 48 to an output terminal 49. Two input terminals 51 and 52 are gating signal input terminals to control the AND gates 47 and 48, which make up the gate circuit 24 connected to the encoder 23 or the gate circuit 28 connected to the encoder 27.

Figure 7A:
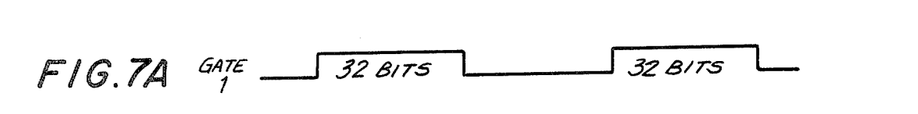
FIGS. 7A–7D are waveforms illustrating the operation of two embodiments of the circuit in FIG. 6.
Figure 7B:
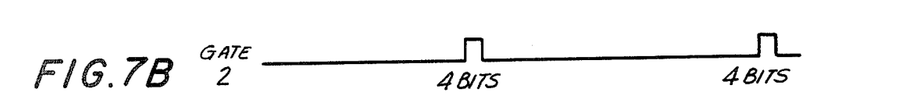
Figure 7C:
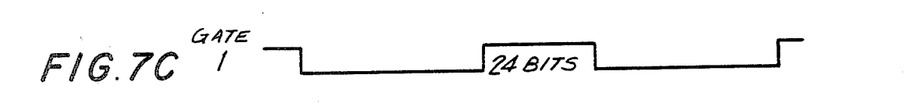
Figure 7D:
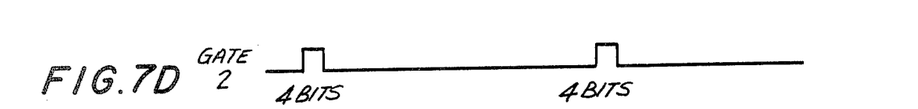

The operation of the circuit in FIG. 6 will be discussed in connection with the gating signals shown in FIGS. 7A-7D. The signals in FIGS. 7A and 7B are those that are applied to the gate circuit 24 while the signals in FIGS. 7C and 7D are those that are applied to the gate circuit 28.

Figure 3B:
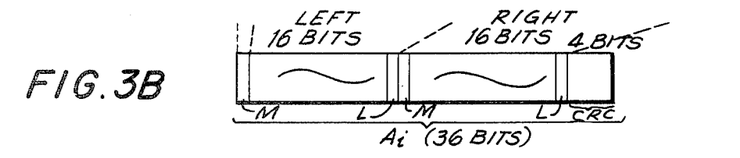

The clusters of 32 bit PCM signals are applied to the input terminal 37 of the encoder 23. During the time this 32 bit signal is being applied, the signal in FIG. 7A is applied to the input terminal 51 to enable the AND circuit 47 to act as a direct connection from the output of the flip-flop 44 back to the second input terminal of each of the exclusive-OR gates 38 and 41. This enables the encoder 23 to operate as a shift register with feedback in accordance with the equation $G(x) = x^4 + x + 1$, as described previously in connection with the cyclic redundancy check code. After the 32 bit interval, which may be considered a digital word, the AND gate 47 is disabled to prevent any further signal feedback from the output of the flip-flop 44 to the exclusive-OR gates 38 and 41. At the same time no further input signals are applied to the terminal 37. During the next four bit intervals, the gating signal in FIG. 7B is applied to enable the AND gate 48, and during this interval, the flip-flops 39 and 42-44 unload through the output terminal 49. As shown the input terminal 37 is directly connected to the output terminal 49 so that, during the 32 bit intervals while the AND gate 48 is disabled, the PCM input signal consisting of 32 bits is transmitted through the short circuit to the output terminal 49. The CRC pulses are added sequentially in the immediately ensuing four bit interval. These bits are clocked at the same rate as the input signal applied to the terminal 37. This is also the same clocking rate as the read clock applied to the terminals 33R and 34R in the time compressor in FIG. 4. Thus, all of the pulses at the output terminal 49 of the circuit in FIG. 6 are at the same repetition rate, and they occur over a 36 bit interval, which is the sum of the two intervals shown in FIGS. 7A and 7B. The complete signal is represented in FIG. 3B as comprising a time-compressed 32 bit portion that corresponds to the signal in FIG. 3A, and a four bit portion that includes the CRC signal. Since the signal in FIG. 3A has been referred to as a digital word, the signal in FIG. 3B may be referred to as an expanded digital word.

The total time difference between the signal in FIG. 3A and that in FIG. 3B is the time required for 28 bits. As suggested previously, this interval can be uniformly filled by a 28 bit signal comprising 24 bits of information and another four bit CRC signal. The 24 bit signal corresponds to the most significant bits of the original information signal applied to the input terminal 21 in FIG. 2, and this signal is illustrated symbolically in FIG. 3C as comprising 12 bits for the left channel and 12 bits for the right channel. This is a truncation of the original signal shown in FIG. 3A, but all that it represents in physical terms is a relatively small reduction in the dynamic range of operation of the system. Since the range of operation represented by even a 12 bit signal is till quite good, the loss of additional range is almost unnoticeable.

Figure 3C:
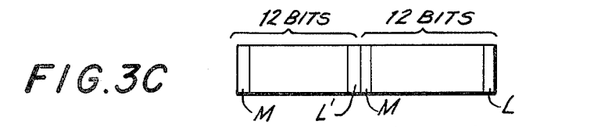
Figure 3D:
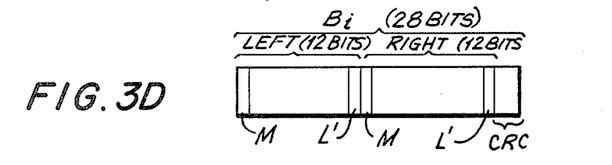

The derivation of the truncated signal from the original input signal at the terminal 21 is made by the gate circuit 25. This truncated signal is then compressed by a time compressor 26 identical with the compressor 22, and it is actually the compressed signal that is represented in FIG. 3C. The CRC signal for the compressed truncated signal is generated in the encoder 27 and the gate circuit 28 by applying the gating signals shown in FIGS. 7C and 7D to the circuit in FIG. 6.

While the signal with a reduced number of bits is, under almost all circumstances, perfectly satisfactory as a comparison signal to compare with the primary signal, which is the signal at the output terminal of the gate 24, it is also possible to use a non-truncated, or full range, comparison signal. This simply means compressing the signals differently. For example the time compressor 26 could be operated to compress a full 32 bit signal by the ratio of 8:3 instead of 2:1. However the bits would no longer have the same reperition rate. It is preferrable to keep the same bit repetition rate and to truncate the signal that passes through the gate 25.

Figure 3E:
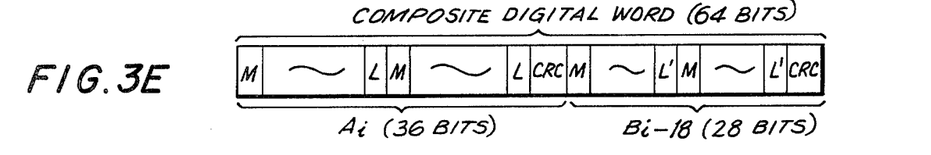
Figure 3F:
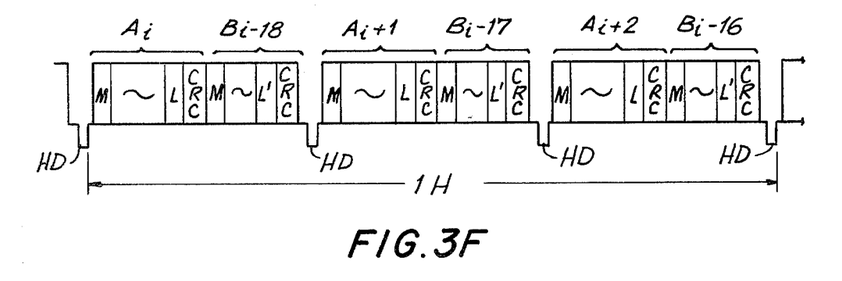

The output signal of the gate 28 as illustrated in FIG. 3B is related to the output signal of the gate 24 in that it represents, or duplicates, the most significant bits of that signal. It can therefore be used as a comparison signal to detect errors that occur in further processing of the primary signal $A_i$ that emerges from the gate 24. In order to make better use of the error-reduction potential of the secondary signal, which now may be referred to as the signal $B_i$ at the output terminal of the gate 28, this signal $B_i$ is delayed by an interval time long enough to make it unlikely that any signal that interferred with the transmission of the signal $A_i$ would also effect the secondary signal $B_i$. This delay is obtained in the delay means 29, and a delay period of approximately six horizontal line intervals has been found sufficient to separate signals $A_i$ and $B_i$ that were generated from the same sampling information. Naturally, since the signals represent substantially the same information and thus start virtually at the same time, it is necessary that the system include sufficient delay of the secondary signals $B_i$ to place them in sequence with the primary signals $A_i$. This delay is equal to the duration of the signals $A_i$ as shown in FIG. 3E. As a result, the delay to offset the related signals by six horizontal line intervals, which is the equivalent of 18 digital words, there being three digital words per line interval, should be $6H + A_i$. If a shorter delay is sufficient, the integer 6H may be replaced by N where N is one composite digital word shown in FIG. 3E to comprise 64 bits. Actually, FIG. 3E has been labeled to indicate that the signal $A_i$ is part of a composite digital word with the signal $B_{i--}$ that is related to the primary signal that occurred 18 digital words previously. FIG. 3F shows one horizontal line interval consisting of three composite digital words illustrating the fixed 18 word delay. FIG. 3F also illustrates the synchronizing signal at three times the horizontal repetition frequency used as word synchronizing signals HD in further processing of the signals.

It should be noted that instead of delaying the signals $B_i$, the signals $A_i$ could be delayed. What is important is that there be a separation in related signal groups, that is, groups derived from the same sampling interval.

The advantage of selecting a predetermined group of each digital word group of the primary multi-bit digital signals $A_i$ to comprise the secondary multi-bit signals $B_i$, delaying one of the signals groups relative to the other, and combining the delayed signal groups in interleaved sequence with subsequent, relatively undelayed signals is only obtained after the signals thus modified have been further processed. In the present embodiment, such further processing includes recording the signals as shown in FIG. 3F on magnetic tape in the VTR 1. As described in detail in the companion applications, supra, this requires additional time compression to insert synchronizing signals before recording and then requires that the synchronizing signals be removed and that the relative timing of the pulses be restored to the original value.

Figure 8:
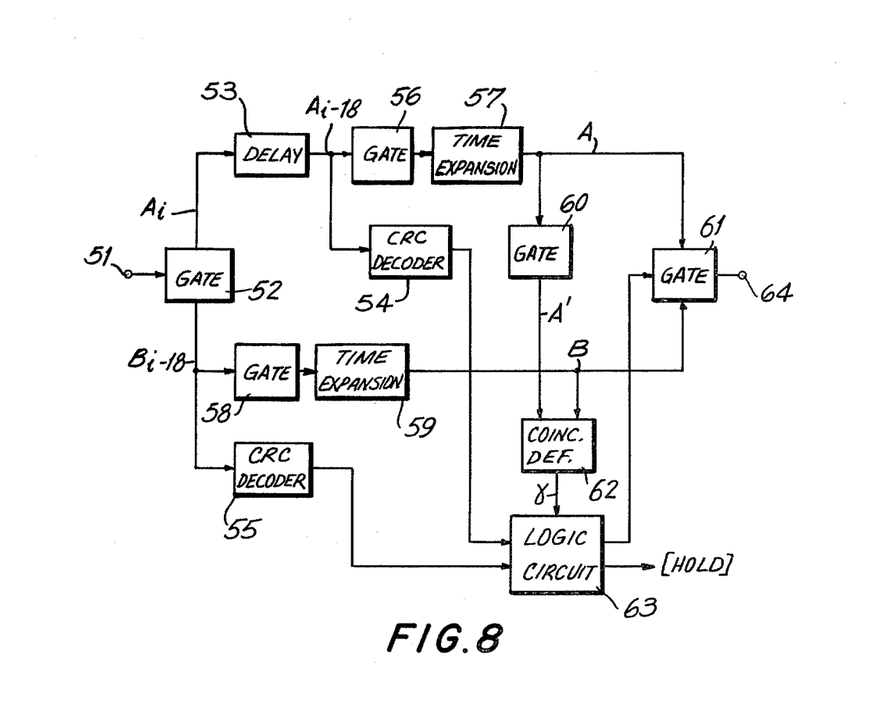
FIG. 8 is a block digram of a decoder suitable for use in the circuit in FIG. 1.

The decoder 12 in FIG. 1 is shown in greater detail in FIG. 8 and is the circuit in which the discrepancy between the signals $A_i$ and $B_i$ is utilized to effect error correction. The decoder circuit includes an input terminal 51 connected to a gate 52 that separates the $A_i$ portion of each composite word from the $B_{i-18}$ portion. The $A_i$ portion is applied to a delay means 53 that achieves the same delay as the delay means 29 in FIG. 2 to bring the $A_{i-18}$ signal into coincidence with the $B_{i-18}$ signal. The $A_i - 18$ signal from the delay means 53 is connected to the input of a CRC decoder 54, and the $B_{i-18}$ signal from the gate 52 is applied to asimilar CRC decoder 55. The output signal of the delay means 53 is also applied to the a gate 56, and the output of the latter circuit is connected to a time expansion circuit 57. In a similar manner, the $B_{i-18}$ signal from the gate 52 is applied to a gate 58, and the output of the latter gate is connected to time expansion circuit 59. The output of the time expansion circuit 57 is connected through a gate 60 that truncates the signal to the same degree that the $B_i$ signal was previously truncated. In addition the output of the time expansion circuit 57 is connected to an output gate 61. In a similar manner the output of the time expansion circuit 59 is connected to another input terminal of the gate 61 and to a coincidence detector 62 that also receives the truncated output signal of the gate 60. Output signals from the CRC decoders 54 and 55 and from the coincidence detector 62 are applied to a logic circuit 63 to produce an output gate control signal connected to the gate 61 and to a "hold" signal.

Figure 9:
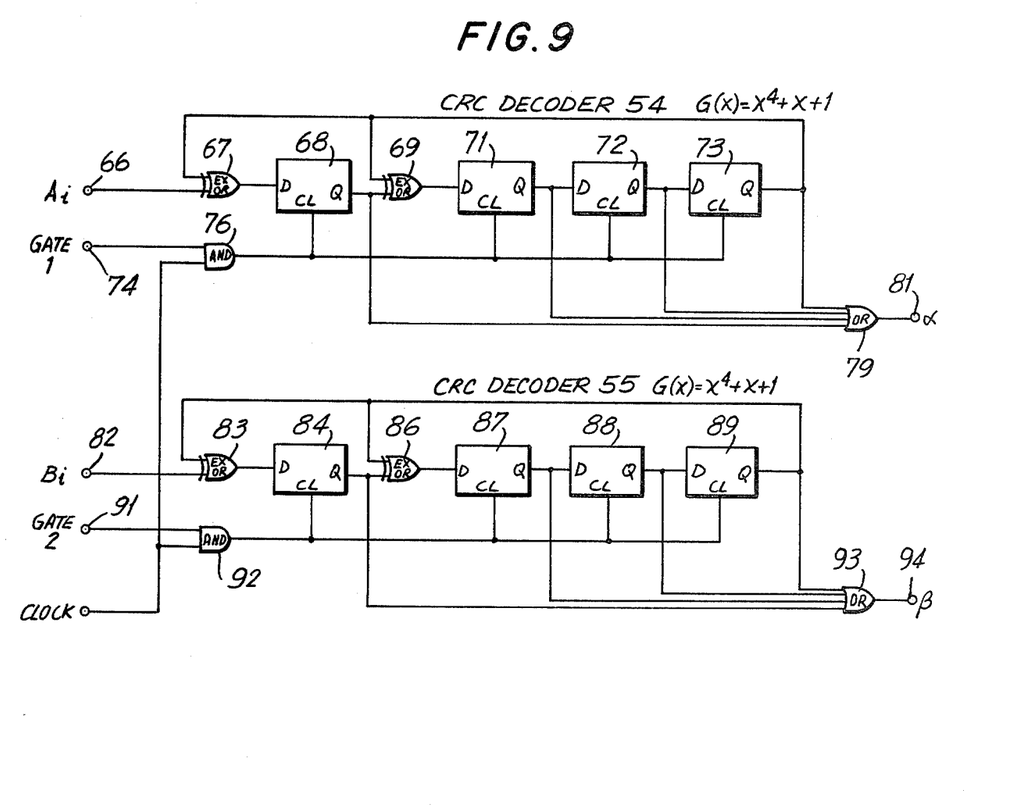
FIG. 9 is a schematic and symbolic circuit representation of CRC decoder circuits as used in the circuit in FIG. 8.

The CRC decoders 54 and 55 in the circuit in FIG. 8 are shown in greater detail in FIG. 9. Each of these circuits is quite similar to the CRC encoder circuit 23 shown in FIG. 6. The decoder 54 includes an input terminal 66 to which the $A_i$ signals are applied. This terminal is connected to one of the input terminals of an exclusive-OR gate 67 the output of which is connected to the D input terminal of a D-type flip-flop 68. The output of the D flip-flop is connected to one of the input terminals of another exclusive-OR gate 69, and the output of the latter is connected to the D input terminal of the first of three successive d-type flip-flops 71–73. The output of the last flip-flop stage 73 is connected directly back to a second input terminal of the exclusive-OR gate 67 and to the second input terminal of the exclusive-OR gate 69. The decoder 54 also has a gate signal input terminal 74 connected to an AND circuit 76, the output of which is connected to the clock signal input terminals of each of the flip-flops 68 and 71–73. The clock signal, itself, is applied by way of a clock signal input terminal 77 to the other input terminal of the AND gate 76. The output terminals of the four flip-flops 68 and 71–73 are connected to a common OR circuit 79, the output terminal of which is identified by reference numeral 81.

The CRC decoder 55 includes an input terminal 82 connected to one input terminal of an exclusive-OR gate 83, the output of which is connected to the D terminal of a D-type flip-flop 84. The output of the flip-flop 84 is connected to one input terminal of an exclusive-OR gate 86, and the output of the exclusive-OR gate 86 is connected to the D input terminal of the first of three D-type flip-flops 87–89 connected in sequence. The output of the flip-flop 89 is connected back to second input terminals of the exclusive-OR gates 83 and 86. A gating signal input terminal 91 is connected to a second input terminal of an AND gate 92, the other input terminal of which is connected to the clock signal input terminal 77. The output of the AND gate 92 is connected to the clock terminals of each of the flip-flops 84 AND 87–89. The output terminals of all four of the flip-flops 84 and 87–89 are connected to input terminals of an OR gate 93 that has an output terminal 94.

Figure 10A:
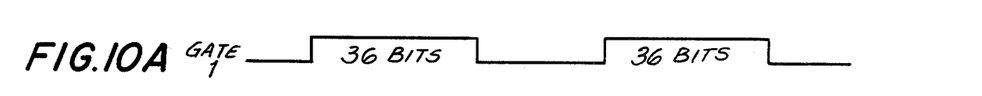
FIGS. 10A–10C are waveforms obtained in the operation of the circuit in FIG. 9.

The input signal $A_i$ applied to the input terminal 66 should be, unless it contains an error, exactly like the $A_i$ signal of the composite digital word represented in FIG. 3E. This section of the digital word is 36 bits long and so the gate signal illustrated in FIG. 10A is applied to the gate signal input terminal 74 to enable the AND gate 76 to allow clock signals applied to the input terminal 77 to clock 36 bits of information into the decoder 54, starting just after each word synchronizing HD shown in FIG. 10C. If there are no errors in the signal $A_i$, the signal $\alpha$ at the output terminal 81 will be "0", but if there are any errors, the signal $\alpha$ will be "1".

Figure 10B:
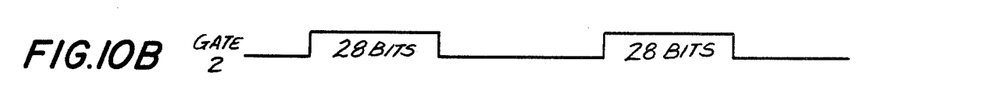
Figure 10C:
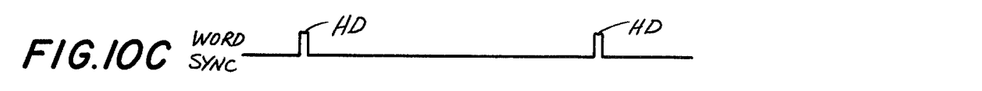

In a similar manner, the gates signal shown in FIG. 10B is applied to the gating signal input terminal 91 to allow 28 bits of information to be clocked into the decoder 55 starting one bit after the word synchronizing pulse HD. If there are no errors in the $B_i$ signal applied to the input terminal 82, the output signal $\beta$ at the output terminal 94 will be "0", but if there are errors, the signal $\beta$ will be "1".

The signals $A_{i\text{-}18}$ and $B_{i\text{-}18}$, which may be referred to as extended word signals because they include CRC components, are applied to the gate circuits 56 and 58, respectively. These gate circuits allow only the basic information signals to pass through and delete the respective CRC signals appended to the basic information signals. Thus, at the output of the gate circuit 56, the signal should correspond exactly to the first 32 bits of the signal illustrated symbolically in FIG. 3B and at the output of the gate circuit 58, the signals should correspond to the signal illustrated symbolically in FIG. 3C, assuming, in each instance, that no error has entered either of the information signals.

The respective information signals, stripped of the CRC pulses, are re-expanded by the respective time expansion circuits 57 and 59. Thus, at the output of the time expansion circuit 57, the signal should be exactly like the signals symbolically illustrated in FIG. 3A, if there is no error in the processed signal. The signal at the output terminal of the time expansion circuit 59 should be similar to the signal in FIG. 3A except that it has a total of 24 bits instead of 32 bits.

The output signals of the time expansion circuit 57 and 59 are compared for coincidence in the coincidence detector 62. However since the output signal of the expansion circuit 59 has only the 24 most significant bits of the 32 bit output signal of the expansion circuit 57, the latter signal may be truncated in the gate 60 to delete its eight least significant bits so that the two signals applied to the coincidence detector 62 will each have the same number of bits of the highest order. These two signals must have the same number of bits, if they contain information for two stereophonic signals, because such signals contain two MSB signals and each of these MSB signals in the primary signal must be compared with the corresponding two MSB signals of the secondary signal.

Figure 12A:
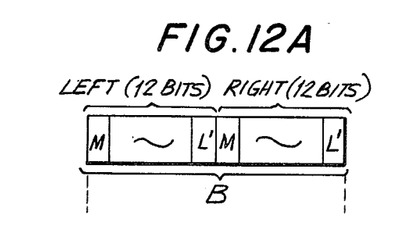
FIGS. 12A and 12B shows a symbolic representation of digital signals as applied to the coincidence detector in FIG. 8.
Figure 12B:
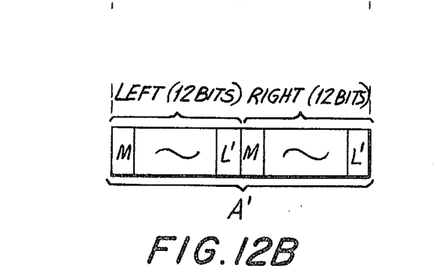

The two signals to be compared in the coincidence detecting circuit are illustrated in FIGS. 12A and 12B. The signal in FIG. 12A is the secondary signal, which was originally generated in truncated form to include only the highest orders of bits from M to L' of the primary signal. Since this signal, as symbolically represented in FIG. 12A, contains only information bits and no CRC bits, it is simply labeled as signal B. The truncated primary signal, which now has the same number of bits as the secondary signal B is referred to as the signal A' to distinguish it from the full range, or non-truncated, primary signal A. If the two signals B and A' coincide bit for bit, the coincidence detector 62 will produce an output signal $\gamma$ having a value of "1". However, if the two signals B and A' do not coincide, the value of the output signal $\gamma$ will be "0".

The full range primary signal A at the output of the time expansion circuit 57 and the truncated secondary, or comparison, signal B at output of the time expansion circuit 59 are applied to separate terminals of the gate circuit 61, which selects one of these two signals to be passed through the gate circuit to an output terminal 64 for further processing. Essentially, the gate 61 is like a switching circuit that connects either the expansion circuit 57 or the expansion circuit 59 to the output terminal 64.

The output signals $\alpha$ and $\beta$ from the CRC decoders 54 and 55 and the output signal $\gamma$ from the coincidence detector 62 are all applied to the logic circuit 63 to generate therein signals to control the operation of the gate 61. The logic circuit is shown in greater detail in FIG. 11. It includes four input terminals 96–99 to receive the signals $\alpha$, $\beta$, and $\gamma$ and the word synchronizing signal HD, respectively. The terminals 96 and 99 are connected to an AND gate 101 the output of which is connected to an inverter 102 and to one input terminal of each of two AND gates 103 and 104. The output terminals 97 and 99 are connected to two input terminals of another AND gate 106, the output terminal of which is connected to the other input terminal of the AND gate 104 and the input of an inverter 107.

Figure 11:
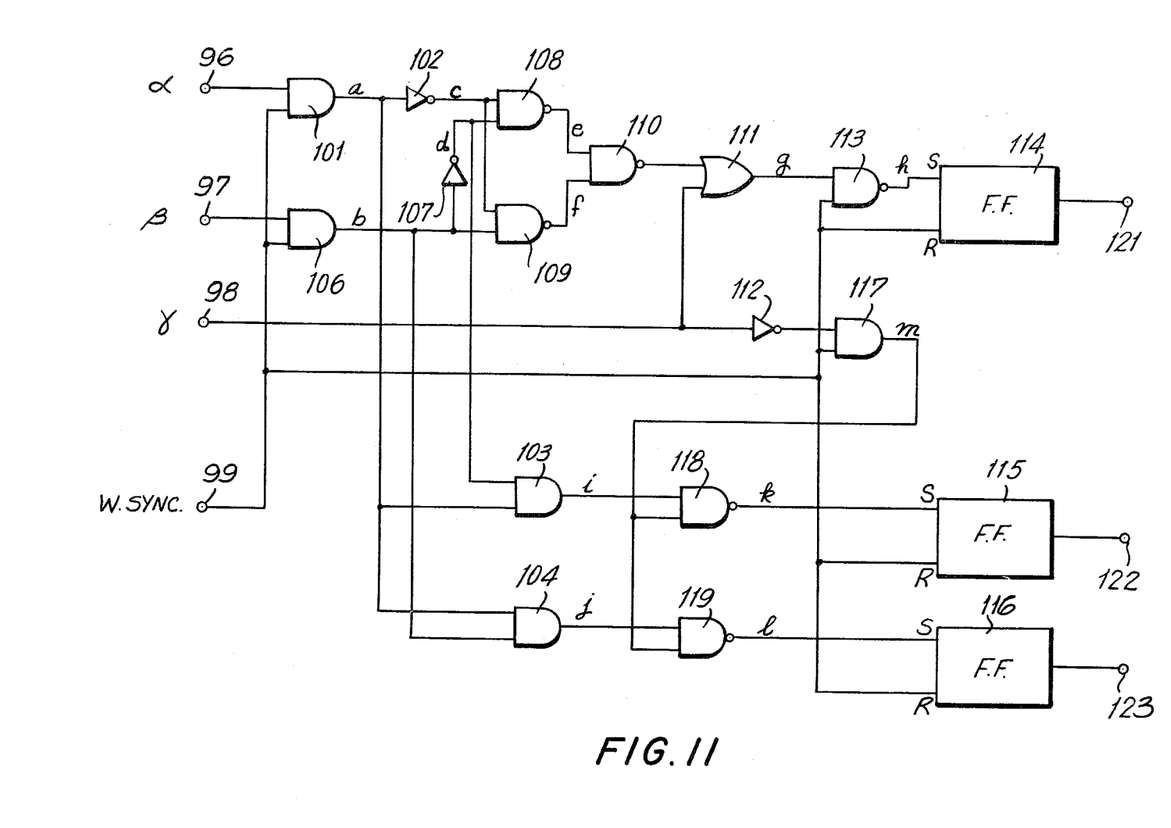
FIG. 11 is a schematic and symbolic diagram of a logic circuit in FIG. 8.

The input terminals of the inverter 102 is connected to one of the input terminals of a NAND gate 108 and to one of the terminals of a second NAND gate 109. The output terminal of the AND gate 106 is connected to the other input terminal of the NAND gate 109. The output terminals of the two NAND gates 108 and 109 are connected to two input terminals of a third NAND gate 110, The output terminal of the NAND gate 110 and the input terminal 98 are connected to the two input terminals of an OR gate 111, and the input terminal 98 is also connected to the input terminal of an inverter 112. The output terminal of the OR gate 111 and the input terminal 99 are connected to the two input terminals of another NAND gate 113, the output terminal of which is connected to the set terminal of a flip-flop 114. The input terminal 99 is connected to the reset terminal of this flip-flop and to the reset terminals of two other flip-flops 115 and 116 as well as to one of the input terminals of an AND gate 117.

The other input terminal of the AND gate 117 is connected to the output terminal of the inverter 112, and the output terminal of the AND gate 117 is connected to one of the input terminals of each of two NAND gates 118 and 119. The output terminals of the AND gates 103 and 104 are connected, respectively, to second input terminals of the NAND gates 118 and 119 respectively, and the output terminals of these NAND gates are connected, respectively, to the set input terminals of the flip-flop 115 and 116. The three flip-flops 114–116 have output terminals 121–123, respectively.

Figure 14:
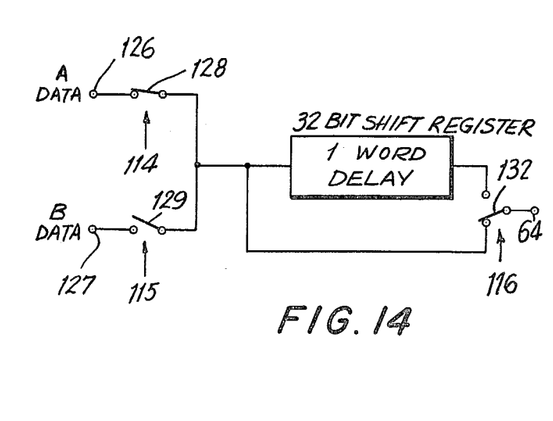
FIG. 14 is a schematic diagram of a gate and memory circuit for use in the circuit in FIG. 8.

The circuit of the gate 61 controlled by the logic circuit 53 is shown in somewhat more detail in FIG. 14. It includes two input terminals 126 and 127 connected, respectively, to output terminals of the time expansion circuits 57 and 59, respectively. In series with the leads from the input terminals 126 are two electronic switching circuits 128 and 129, which are controlled by the flip-flops 114 and 115, respectively, as indicated by the labels on the arrows adjacent the symbols of the switching circuit.

The switching circuits 128 and 129 are connected together to the input terminal of a delay or memory device 131 having sufficient capacity to store enough signal bits to equal one full range primary signal A. For example, the device 131 may be a 32 bit shift register. The output of the device is connected to one terminal of a double-throw switching circuit 132, the arm of which is connected to the output terminal 64. The other terminal of the switching circuit 132 is directly connected to the output terminals of the switching circuits 128 and 129. As indicated by the arrow adjacent the symbol of the switching circuit 132, the state of conductivity of that switching circuit is controlled by the flip-flop 116.

Figure 13:
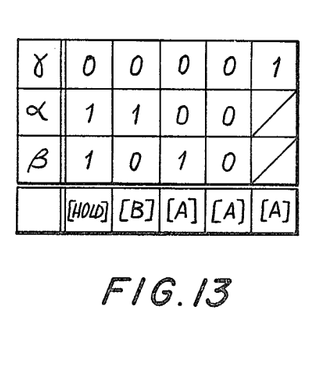
FIG. 13 is a truth table representing logic conditions in the operation of the circuit in FIG. 8.

The logical relationship between the signals $\alpha$, $\beta$, and $\gamma$ and the conditions of the signals transmitted from the gate 61 to the output terminal 64 is summarized in the truth tble in FIG. 13. When the signal $\gamma$ has the value "1" after comparing one digital word of the truncated primary signal A' with a corresponding digital word of the secondary signal B, the truth table indicates that the signal A will be transmitted through the switching circuit 132 to the output terminal 64, no matter whether the signals $\alpha$ and $\beta$ are "0" (whic is probable if the value of signal $\gamma$ is "1") or "1".

When $\alpha=0$, and $\gamma=0$, indicating that there are no errors in the primary signal A, the switching circuit 128 is also closed and the switching circuit 132 connects the primary signal A directly to the output terminal 64. This condition exists whether or not the signal $\beta$ also has the value "0".

On the other hand, if $\alpha=1$, indicating that there are errors in the primary signal A, but $\beta=0$, indicating that there are no errors in the secondary signal, the switching circuit 128 will be open, and the switching circuit 129 will be closed. The switching circuit 132 will continue to conduct the signal directly to the output terminal 64. The fact that this will be the somewhat truncated, secondary signal B instead of the full range signal A only means that the smallest changes in amplitude represented by the least significant bits will not be present in the signal at the terminal 64, but the omission of these lowest order bits for one digital word or even for several words will be virtually unnoticeable.

If there are errors in both signals A and B, $\alpha=\beta=1$. In such rare instances, both the switching circuits 128 and 129 will be open-circuited until the next digital word is measured. However, instead of suddenly dropping the digital signal at the output terminal 64 to a zero condition for one digital word interval, which might cause a sudden high-amplitude negative signal to be produced by the D-A converters 14L and 14R, the switching circuit 132 is actuated to connect the output terminal of the memory or delay device 131 to the output terminal 64. The device 131 has received whichever word signal was carried through the switching circuit 132, and has replaced each word signal with the next word signal as long as one of the switching circuits 128 or 129 was conductive. When neither is conductive the device 131 still has the last-used word signal in it and, can unload this signal to the output terminal via the switching circuit 132. This simply means that for a very short interval of time, the output signal will remain constant. This is less likely to be objectionable than if the output signal value were allowed to vary sharply.

As an alternative to providing the storage device 131, the circuit may be arranged to interrupt the supply of clock pulses to the D-A converters in FIG. 2 for one digital word interval if $\alpha=\beta=1$, thereby effectively holding the output signal level relatively constant briefly.

The operation of the circuit in FIG. 11 to obtain the signals to control the switching circuits 128, 129 and 132 in FIG. 14 will now be described.

Various circuit point within the circuit in FIG. 11 are labeled alphabetically for ease of description of the operation of the circuit. The three signals $\alpha$, $\beta$, and $\gamma$ establish the operating conditions of the circuit 53, while the word synchronizing pulses applied to the terminal 99 initiate each operation. That is, it is only when a word synchronizing signal pulse is applied to the input terminal 99 and from there to each of the reset terminals of the flip-flops 114–116 that the output terminals 121–123 will be forced to take on the values determined by the logical "0" or "1" values of the signals $\alpha$, $\beta$, and $\gamma$.

If the truncated primary signal A' exactly corresponds to the secondary signal B in the coincidence detector 62, thereby making the signal $\gamma=1$, this signal point g at the output of the OR gate 111 will have value "1", no matter what the output value of the NAND gate 110 happens to be. As a result, the circuit point h at the output of the NAND gate 113 and at the set terminal of the flip-flop 114 will also be "1" until the word synchronizing signals applied to the other input terminal of the NAND gate 113 raises that input terminal to the value of "1", thereby dropping the output signal at the circuit point h to "0" for the duration of the word synchronizing pulse. This causes the output terminal 121 to have the value "1". As previously stated, this closes the switching circuit 128 in FIG. 14 and causes the switching circuit 132 to conduct the full range signal A through to the output terminal 64.

In the foregoing condition, when $\gamma=1$, the inverter 112 inverts this to the value "0" thus disabling the AND gate 117 and holding the circuit point m at "0". This prevents either of the NAND gates 118 or 119 from responding to a word synchronizing pulse to set either of the flip-flops 115 and 116. As a result, both of the output terminals 122 and 123 have the value "0".

When $\gamma=0$, it indicates that there is an error either in the truncated primary signal A' or in the secondary signal B compared therewith. If it is assumed that the error is in the secondary signal B, the signal $\beta$ will have the value "1" and the signal $\alpha$ will have the value "0". As a result, the circuit point a will have the value "0" and the voltage level at the circuit point b at the output of the AND gate 106 will correspond to the word synchronizing signal applied to the input terminal 99. The inverter 102 will invert the value "0" at the circuit point a to the value "1" at the circuit point c. The inverter 107 will invert the word synchronizing pulse signal at the circuit point b and apply this inverted synchronizing pulse to the NAND gate 108. The conditions of the circuit point c and d will cause the output of the NAND gate 108 at the circuit point e to follow the word synchronizing pulse. At the same time, the conditions of the circuit points b and c at the input terminals to the NAND gate 109 will cause the output of that NAND gate at the circuit point f to be the inverse of the word synchronizing pulse signal, and therefore, opposite to the signal at the point e at all times. Thus, one or the other of the input terminals of the NAND gate 110 will always be at the value "0", and therefore the output terminal of this NAND gate will always be "1" in response to such input conditions. This will cause the output of the OR gate 111 following the NAND gate 110 to have the value "1" at the circuit point g. This represents the same condition that prevailed when the value of the signal $\gamma$ was "1", and so the output terminal 121 of the flip-flop 114 will be at the value "1", causing the switching circuit in the FIG. 14 to be closed so as to transmit the signal A to the output terminal 64.

Since the outpt of the AND gate at point a is "0", both of the AND gates 103 and 104 will have "0" values at their output terminals and, hence, at the circuit points i and j. These conditions keep the output values of the NAND gates 118 and 119 at the points k and l at "1" so that the output terminals 122 and 123 of the flip-flops 115 and 116 remain at "0", keeping the switching circuits 129 and 132 in FIG. 14 in the conditions shown.

The condition just described in detail in which $\alpha=0$, $\gamma=0$, and $\beta=1$ is Condition II in the following Table in which the initials $\overline{W.S.}$ stand for word synchronizing pulse and the symbol W.S. stands for the inverted word synchronizing pulse. The previous condition in which $\gamma=1$ is Condition V in the Table.

If there is an error in the primary signal A but none in the secondary signal B, the vaue of $\alpha$ will be "1" and the value of $\beta$ will be "0". The value of $\gamma$ will be "0". This is Condition III in the Table and therefore need not be described in words.

If both the primary and secondary signals A and B have errors so that $\alpha=\beta=1$ and $\gamma=0$, the logic circuit will operate according to Condition IV in the Table, and as previously described will cause the switching circuit 132 in FIG. 14 to draw a replacement from the storage device 131. In effect this makes three signals available to the output terminal 64 without delay; signal A as a first choice, signal B as a second choice, and the signal stored in the device 131 as a third choice.

TABLE

| Circuit Points | Conditions | | | | |
|---|---|---|---|---|---|
| | I | II | III | IV | V |
| 96( input) | 0 | 0 | 1 | 1 | |
| 97( input) | 0 | 1 | 0 | 1 | |
| 99( input) | 0 | 0 | 0 | 0 | 1 |
| a | 0 | 0 | W.S. | W.S. | |
| b | 0 | W.S. | 0 | W.S. | |
| c | 1 | 1 | $\overline{W.S.}$ | $\overline{W.S.}$ | |
| d | 1 | $\overline{W.S.}$ | 1 | $\overline{W.S.}$ | |
| e | 0 | W.S. | W.S. | W.S. | |
| f | 1 | $\overline{W.S.}$ | 1 | 1 | |
| g | 1 | 1 | $\overline{W.S.}$ | $\overline{W.S.}$ | 1 |
| h | $\overline{W.S.}$ | $\overline{W.S.}$ | 1 | 1 | |
| i | 0 | 0 | W.S. | 0 | |
| j | 0 | 0 | 0 | W.S. | |
| k | 1 | 1 | $\overline{W.S.}$ | 1 | 1 |
| l | 1 | 1 | 1 | $\overline{W.S.}$ | 1 |
| m | W.S. | W.S. | W.S. | W.S. | 0 |
| 121 | 1 | 1 | 0 | 0 | 1 |
| 122 | 0 | 0 | 1 | 0 | 0 |
| 123 | 0 | 0 | 0 | 1 | 0 |

Condition I represents a state in which analysis of the CRC code in each of the decoders 54 and 55 indicates that there is no error in either the A signal nor the B signal, so that $\alpha=\beta=0$. Yet the statement $\gamma=0$ means that the most significant bits of the two signals do not coincide so that at least one of them must be in error. This requires that the error be such as to make the error cause the information signal or cause both the CRC signal and information signal to shift precisely to a new value that will be decoded as a permissible, and therefore correct, value. Such a situation, while possible, has a very low probability of occurrence. The logic circuit 63 is arranged under this condition to select the primary signal A to be passed through the gate 61 to the output terminal 64.

Figure 15A:
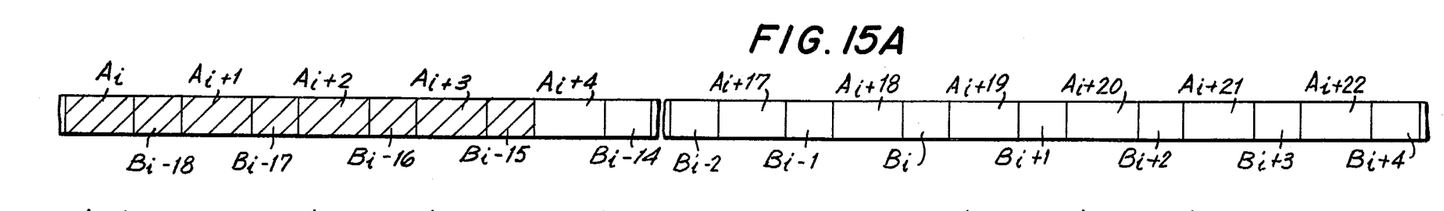
FIGS. 15A and 15B shows a symbolic representation of signals as processed according to this invention to illustrate error reduction.

FIG. 15A shows the effect of this invention in ovrcoming a noise burst that extends over three composite digital words including the primary signals $A_i$ through $A_{i+2}$ and the secondary signals $B_{i-18}$ through $B_{i-15}$ grouped within this interval. As indicated in FIG. 3F, this is one horizontal line interval.

Figure 15B:
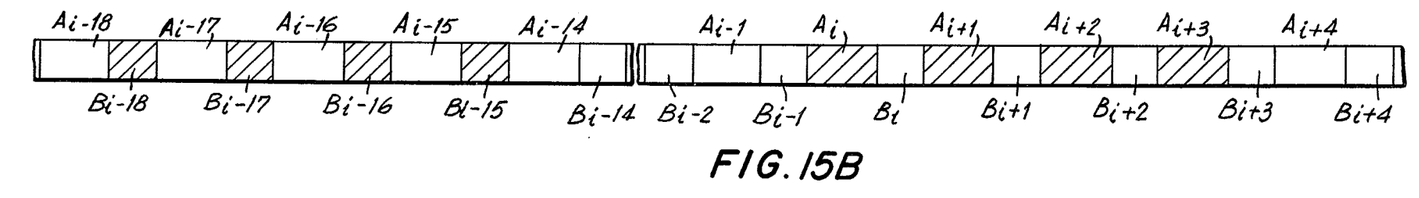

As shown in FIG. 15B, after the composite word signals have been separaed and the error-free primary signals $A_{i-18}$ through $A_{i-15}$ brought into the same time intervals with the erroneous secondary signals $B_{i-18}$ through $B_{i-15}$, the logic circuit 53 can easily select the error-free primary signals for further processing, for example inn the serial-to- parallel converter 13 and on beyond.

In the same way, when the erroneous signals $A_i$ through $A_{i+3}$ have been brought into the same time intervals with the error-free related secondary signals $B_i$ through $B_{i+3}$, the logic circuit 63 can easily selected the error-free secondary signals for further processing. Thus, the advantage of the invention is obtained.

What is claimed is:

1. A method of reducing errors in processing digital signals grouped into digital words and which comprise first multi-bit signals, said method comprising the steps of: selecting a predetermined group of each digital word group of said first multi-bit signals to comprise second multi-bit signals by selecting by part of the digital signals of each of said digital words, each digital word group and said predetermined group thereof comprising related signal groups; delaying one of said signal groups relative to another of said groups; and combining the delayed signal groups in interleaved sequence with subsequent, relatively undelayed signal groups to form composite, sequential signals.

2. A method of reducing errors in processing digital signals groups into digital words, said digital signals comprising pulse code modulated multi-bit signals with a range of higher to lower bit orders between a most significant bit and a least significant bit, said method comprising the steps of: selecting a predetermined group of each digital word group of a plurality of higher bit orders of said pulse code modulated signals to comprise second multi-bit signals, each digital word group and said predetermined group thereof comprising related signal groups; delaying one of said signal groups relative to another of said groups; and combining the delayed signals groups in interleaved sequence with subsequent, relatively undelayed signal groups to form composite, sequential signals.

3. The method of claim 2 comprising the step of time-compressing multi-bit signals.

4. The method of claim 2 comprising the steps of time-compressing said first multi-bit signals and separately time-compressing said second multi-bit signals before combining said delayed signal groups with said relatively undelayed signal groups.

5. The method of claim 4 comprising adding a group of first cyclic redundancy check code signals to the time-compressed delayed signal groups and a group of second cyclic redundancy check code signals to the time-compressed relatively undelayed signal groups before combining said time-compressed delayed signal group and said time-compressed relatively undelayed signal groups.

6. The method of claim 5 in which said step of delaying said one of said signal groups comprises delaying such groups by the length of time occupied by one of said time-compressed relatively undelayed signal groups plus the time occupied by the first cyclic redundancy check code signals therefor plus an integer N times a full interval occupied by a complete set of said time-compressed delayed signals and said time-compressed relatively undelayed signals and said first and second cyclic redundancy check code signals, wherein $N \leq 0$.

7. The method of claim 6 in which all of said time-compressed signals are compressed by a ratio of 2:1.

8. The method of claim 5 in which each of said first redundancy check code signals comprises P bits immediately following each said time-compressed delayed signal group, and each of said second redundancy check code signals comprises P bits immediately following each said time-compressed relatively undelayed signal group.

9. The method of claim 8 in which the total number of bits in each said predetermined group is 2P less than the total number of bits in each said digital word group.

10. The method of claim 9 in which the number of bits in each said digital word group is 32, the number of bits of each said predetermined group is 24 and the total number of said cyclic redundancy check code signals is 8.

11. A method of reducing errors in processing digital signals grouped into digital words, said digital signals comprising first multi-bit signals, said method comprising the steps of: selecting a predetermined group of each digital word group of said first multi-bit signals to comprise second multi-bit signals, each digital word group and said predetermined group thereof comprising related signal groups; time-compressing said first multi-bit signals and said second multi-bit signals; delaying one of said signal groups relative to another of said groups; combining the delayed signal groups in interleaved sequence with subsequent, relatively undelayed signal groups to form composite, sequential signals; processing the combined signals; and re-expanding the processed signals to their original time durations.

12. The method of claim 11 comprising selectively delaying the processed signals to re-establish the original relative timing between re-expanded first and second multi-bit signals.

13. The method of minimizing errors in a composite signal comprising groups of first multi-bit digital word signals interleaved with groups of second multi-bit digital signals in which each of said groups of second multi-bit signals is a predetermined group of one of said digital word signals and each of said signals of one of said groups is delayed relative to the signals of the other of said groups, said composite signal comprising a plurality of first multi-digit cyclic redundancy check code binary signals, each related to one of said digital word signals and each following a group of said first signals and preceding the next group of said second signals and a plurality of second multi-digit cyclic redundancy check code binary signals, each related to one of said groups of second multi-bit digital signals and each following a group of said second signals and preceding the next group of said first signals, said method comprising comparing the delayed and relatively undelayed signals and choosing for further processing the one of said compared signals having minimum errors.

14. The method of claim 13 in which the step of choosing the one of said compared signals having minimum errors comprises choosing said first multi-bit digital signals if both of said compared signals have no errors.

15. The method of claim 13 comprising storing the chosen signal until the time of making the next comparison and if, at that time, neither of the compared signals is free of errors, choosing the stored signal for further processing another time.

16. Apparatus for processing a primary multi-bit digital signal, said apparatus comprising:
first means to receive said primary signal into said apparatus;
second means to generate a secondary multi-bit digital signal comprising at least the high order bits of said primary signal;
delay means connected to one of said first and second means to delay the signal therein relative to the signal in the other of said first and second means by a predetermined interval of time;
first gating means connected to said delay means and to said other of said first and second means to conduct, alternately, the delayed signal and the signal in said other of said first and second means;

first time-compression means connected to said first means to receive and store said primary signal at one rate and to extract said primary signal from storage at a higher rate in first groups spaced apart in time;

second time-compression means connected to said second means to receive and store said secondary signal at said one rate and to extract said secondary signals from storage at said higher rate in second groups spaced apart in time; and second gating means connected to said first and second time compression means to extract said groups of said primary signal in alternation with said groups of said secondary signal.

17. Apparatus for processing a primary multi-bit digital signal, said apparatus comprising:

first means to receive said primary signal into said apparatus;

second means to generate a secondary multi-bit digital signal comprising at least the higher order bits of said primary signal;

delay means connected to one of said first and second means to delay the signal therein relative to the signal in the other of said first and second means by a predetermined interval of time;

first gating means connected to said delay means and to said other of said first and second means to conduct, alternately, the delayed signal and said signal in the other of said first and second means;

first time-compression means connected to said first means to receive and store said primary signal at one rate and to extract said primary signal from storage at a higher rate in first groups spaced apart in time;

second time-compression means connected to said second means to receive and store said secondary signal at said one rate and to extract said secondary signals from storage at said higher rate in second groups spaced apart in time;

second gating means connected to said first and second time compression means to extract said groups of said primary signal in alternation with said groups of said secondary signal;

first check code generating means connected to said first means to receive said primary signal to generate a first check code signal based on each of said first signal groups;

second check code generating means connected to said second means to receive said secondary signal to generate a second check code signal based on said secondary signal groups; and third gating means connected to said first and second check code generating means to transmit, in sequence, an interval of predetermined length of said primary signal, an interval of predetermined length of said first check code signal; and interval of predetermined length of said secondary signal, and an interval of predetermined length of said second check code signal as a composite digital word signal.

18. The apparatus of claim 17 comprising:

decoding gate means for separating each interval of said primary signal and each interval of said first check code signal from each interval of said secondary signal and each interval of said second check code signal;

first decoding means connected to said decoding gate means to decode said primary signal and said first check code signal to generate a first logic signal having a value based on the existence of error in the primary signal portion of said digital word signal;

second decoding means connected to said decoding gate means to decode said secondary signal and said second check code signal to generate a second logic signal having a value based on the existence of error in the secondary signal portion of said digital word signal; and switching means connected to said first and second decoding means and to an output circuit to be controlled by said first and second logic signals to connect either said primary signal or said secondary signal to said output circuit.

19. Apparatus for processing a digital signal divided into composite digital word portions, each of said composite word portions comprising a primary digital word, a first check code signal for said primary digital word, a secondary digital word related in information content to a primary digital word in a different composite digital word portion occurring at a different time in said digital signal, and a second check code signal for said secondary digital word, said apparatus comprising:

a source of said digital signal;

delay means selectively connected to said source to bring each said secondary digital word and the primary digital word related thereto in information content substantially into time coincidence; and comparison means connected to said delay means and to said source to compare each said secondary digital word to the primary digital word related thereto in information content and to generate a logic signal having a predetermined value if at least a predetermined portion of each of the compared digital signals are identical.

20. The apparatus of claim 19 in which said secondary digital word includes only the higher order bits of said primary digital word related in information content, and said apparatus comprises means to truncate each said primary digital word to match the bit orders in said secondary digital word, the matched bit orders comprising said predetermined portion.

21. The apparatus of claim 19 comprising selection means connected to said comparison means to select said primary digital signal if the compared digital signals are identical.

22. The apparatus of claim 21 comprising:

decoding means connected to said source to generate a second logic signal having a predetermined value if said primary digital word is error-free; and logic circuit means connected to said decoding means and to said selection means to be actuated by said second logic signal to select said primary digital word if said primary digital word is error-free.

23. The apparatus of claim 22 in which said delay means is connected in series between said source and said decoding means.

24. Apparatus for processing a digital signal divided into composite digital word portions, each of said composite word portions comprising a primary digital word, a first check code signal for said primary digital word, a secondary digital word related in information content to a primary digital word in a different composite digital word portion occurring at a different time in said digital signal, and a second check code signal for said secondary digital word, said apparatus comprising:

a source of said digital signal;

delay means selectively connected to said source to bring each said secondary digital word and the primary digital word related thereto in information content substantially into time coincidence;

comparison means connected to said delay means and to said source to compare each said secondary digital word to the primary digital word related thereto in information content and to generate a first logic signal having a predetermined value if at least predetermined portions of the compared digital signals are identical;

selection means connected to said comparison means to select said primary digital signal if the compared digital signals are identical;

first decoding means connected to said source to generate a second logic signal having a predetermined value if said primary digital word is error-free;

logic circuit means connected to said decoding means and said detection means and being actuated by said second logic signal to select said primary digital word if said primary digital word is error-free; and second decoding means connected to said source to generate a third logic signal having a predetermined value if said secondary digital word is error-free, said logic circuit means being connected to said second decoding means to cause said selection means to be actuated by said third logic signal to select said secondary digital word if said primary digital word has an error and said secondary digital word is error-free.

25. The apparatus of claim 24 comprising:

means to store and to repeat a previously selected one of said digital words, said logic means being responsive to said first-named, said second, and third logic signals to actuate said selection means to select the previously selected one of said digital words if there are errors in the primary and secondary digital words controlling the generation of said second and third logic signals.

* * * * *